(12) United States Patent
Shah et al.

(10) Patent No.: US 7,010,549 B2
(45) Date of Patent: **\*Mar. 7, 2006**

(54) METHOD AND SYSTEM FOR ENABLING TRAINING OF FIELD SERVICE PERSONNEL AND FIELD SERVICE OF MACHINES

(75) Inventors: Rasiklal Punjalal Shah, Latham, NY (US); Richard Alan Grothman, Pewaukee, WI (US); Kenneth Edward Hahn, Greendale, WI (US); Bruce Taylor Ward, Lake Mills, WI (US); Douglas Robert Hofstetter, Sussex, WI (US); Richard Lee Frowein, Waukesha, WI (US)

(73) Assignee: General Electric Company, Niskayuna, NY (US)

(*) Notice: Subject to any disclaimer, the term of this patent is extended or adjusted under 35 U.S.C. 154(b) by 183 days.

This patent is subject to a terminal disclaimer.

(21) Appl. No.: 10/687,408

(22) Filed: Oct. 14, 2003

(65) Prior Publication Data

US 2004/0083235 A1    Apr. 29, 2004

Related U.S. Application Data

(62) Division of application No. 09/606,093, filed on Jun. 27, 2000.

(60) Provisional application No. 60/157,795, filed on Oct. 5, 1999.

(51) Int. Cl.
*G06F 7/00* (2006.01)

(52) U.S. Cl. .................. 707/104.1; 707/2; 707/3; 707/6; 707/101; 707/102; 707/103

(58) Field of Classification Search .................. 707/3, 707/10, 2, 6, 101, 102, 103, 104.1
See application file for complete search history.

(56) References Cited

U.S. PATENT DOCUMENTS

| 5,471,382 | A | * | 11/1995 | Tallman et al. | ........ 364/413.01 |
|---|---|---|---|---|---|
| 5,548,714 | A | | 8/1996 | Becker | .................. 395/183.02 |
| 5,802,524 | A | * | 9/1998 | Flowers et al. | ............. 707/103 |
| 5,823,781 | A | * | 10/1998 | Hitchcock et al. | .......... 434/118 |
| 5,890,175 | A | * | 3/1999 | Wong et al. | ................ 707/505 |

(Continued)

OTHER PUBLICATIONS

G. Gery, "Electronic Performance Support Systems", "How and why to remake the strategic application of technology", Amdahl Corporation, 1991, ISBN 0-9646223-0-0, Chapter 4, pp. 88-103.

*Primary Examiner*—Thuy N. Pardo
(74) *Attorney, Agent, or Firm*—Penny A. Clarke; Patrick K. Patnode

(57) ABSTRACT

A method and system are disclosed for enabling training of field service personnel such as field engineers and field service of machines such as medical diagnostic machines, e.g., CT, MRI, and x-ray machines. The system (100) is desirably implemented over the Internet in which field service personnel using handheld computers are able to selectively search cataloged items relating to reference materials such as portions of product installation manuals, service manuals, field modification information or updates, training manuals, safety information, design diagrams, parts lists, etc., and retrieve copies of the relevant portions of the reference materials. The reference materials are cataloged and searchable using, for example, data relating to a product type and model, a skill level, a service task, and an authorization level.

42 Claims, 6 Drawing Sheets

U.S. PATENT DOCUMENTS

| | | | |
|---|---|---|---|
| 6,081,508 A * | 6/2000 | West et al. | 370/238 |
| 6,091,956 A * | 7/2000 | Hollenberg | 455/456 |
| 6,138,056 A * | 10/2000 | Hardesty et al. | 700/174 |
| 6,199,099 B1 * | 3/2001 | Gershman et al. | 709/203 |
| 6,233,428 B1 * | 5/2001 | Fryer | 434/308 |
| 6,317,718 B1 * | 11/2001 | Fano | 705/1 |
| 6,324,534 B1 * | 11/2001 | Neal et al. | 707/3 |
| 6,356,543 B1 * | 3/2002 | Hall et al. | 370/352 |
| 6,401,085 B1 * | 6/2002 | Gershman et al. | 707/4 |
| 6,484,165 B1 * | 11/2002 | Beall et al. | 707/3 |
| 6,584,462 B1 * | 6/2003 | Neal et al. | 707/3 |
| 6,748,376 B1 * | 6/2004 | Beall et al. | 707/3 |

* cited by examiner

FIG. 2

CATALOGED ITEM

Description Information

| | |
|---|---|
| Modality: | |
| Product: | |
| Skill Level: | |
| Primary Service Task: | |
| Secondary Service Task: | |
| Additional Service Tasks: | |
| Keywords: | |
| Authorization Level: | |

Block Information

| | |
|---|---|
| Title: | |
| Document: | |
| Revision: | |
| Direction: | |
| Section: | |
| Page: | |
| Locations: | |
| File Size: | |
| CDROM Revision: | |

History

| | |
|---|---|
| Created By: | |
| Created On: | |
| Last Modified By: | |
| Last Modified On: | |

[Go to previous Revision]   [Go to Next Revision]

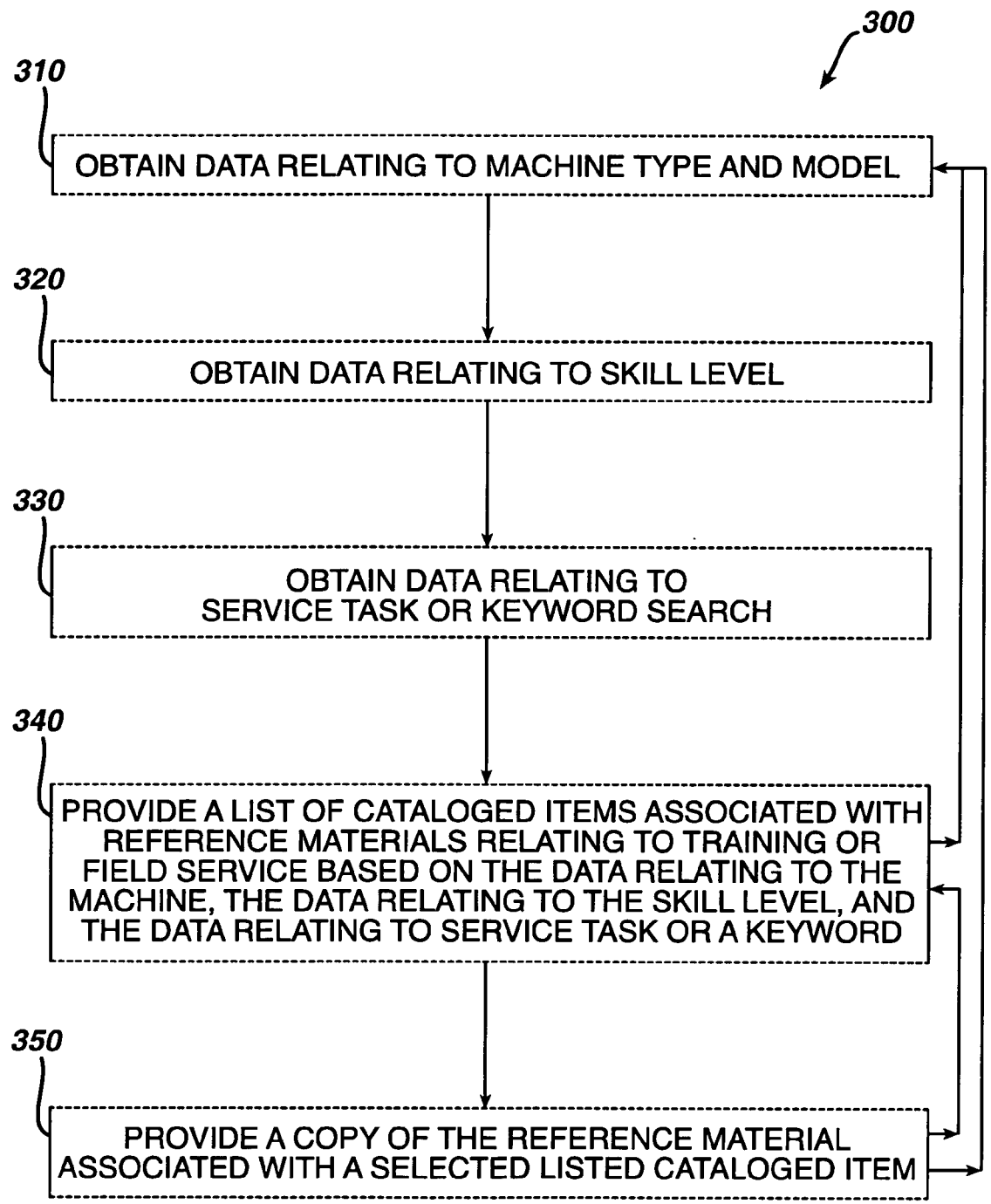

FIG. 6

Search Results

| Search Parameters | | |
|---|---|---|
| Modality: CT | Product: Lightspeed Qxi | |
| Primary Service Task: Install System | Skill Level: All | |
| Secondary Service Task: Software Install | | |

Key Items

☐ Customer Options
Section 5.5.0 — LightSpeed (QXI) Advanced Service Manual 2211222-100 — [View Item]

☐ network prep
Section 12.2.0 — LightSpeed (QXI) Advanced Service Manual 2211222-100 — [View Item]

☐ DICOM
Section 12.2.3 — LightSpeed (QXI) Advanced Service Manual 2211222-100 — [View Item]

☐ Hospital Network
Section 12.3.1 — LightSpeed (QXI) Advanced Service Manual 2211222-100 — [View Item]

☐ system network
Section 12.3.2 — LightSpeed (QXI) Advanced Service Manual 2211222-100 — [View Item]

[Next Results]

[Save Search]  [Modify Search]

600

METHOD AND SYSTEM FOR ENABLING TRAINING OF FIELD SERVICE PERSONNEL AND FIELD SERVICE OF MACHINES

CROSS REFERENCE TO RELATED APPLICATIONS

This application is a division of application Ser. No. 09/606,093, filed Jun. 27, 2000, which is hereby incorporated by reference in its entirety.

This application claims the benefit of U.S. Provisional Application No. 60/157,795, filed Oct. 5, 1999, entitled "Information Integration for Just-In-Need-Training," the contents of which is hereby incorporated in its entirety by reference.

BACKGROUND OF THE INVENTION

The present invention relates generally to database search and retrieval methods and systems, and more specifically, to computer implemented methods and systems for enabling training of field service personnel and field service of machines.

Typically, training of field service personnel such as field engineers for installation and repair of machines such as computed tomography machines and magnetic resonance machines requires spending several weeks at a training site where trainers introduce the field service personnel to a set of written training materials.

Drawbacks with this type of training approach are that the training materials are often created by design engineers who are unfamiliar with field service constraints, the training materials are often directed to a specific machine and structured in a serial fashion, the training materials are geared to a specific skill level of the field service personnel or limited to a general overview which involves many compromises, and the training materials are often difficult to search for reference to a specific problem.

Typically, field service personnel carry to a site such as a hospital, various reference materials such as product manuals and training manuals for reference in installing and repairing such medical machines. Oftentimes, if a field engineer is not knowledgeable with repairing a particular malfunction, a second more experienced field engineer possessing the necessary skills is required to subsequently visit the hospital to repair the malfunctioning machine.

There is a need for a computer implemented method and system for retrieving cataloged reference materials, such as relevant portions of product manuals and training manuals, for enabling training of field service personnel and field service of machines.

BRIEF SUMMARY OF THE INVENTION

The present invention provides, in a first aspect, a computer implemented method for at least one of enabling training of field service personnel and field service of machines in which the computer implemented method includes obtaining a reference material search request, providing a list of at least one cataloged item associated with at least one reference material relating to at least one of training of field service personnel and field service of machines based on the reference material search request, and providing a copy of the at least one reference material associated with the at least one cataloged item.

In a second aspect, a method for at least one of enabling training of field service personnel and field service of machines is implemented, for example, over the Internet. The method includes obtaining at a first computing unit a reference material search request from a second computing unit, for example, a handheld computer, coupled to the first computing unit via a communications network, providing to the second computing unit a list of at least one cataloged item associated with at least one reference material from the first computing unit based on the search request, and providing to the second computing unit a copy of the at least one reference material associated with the at least one cataloged item from the first computing unit.

The methods and systems of the present invention advantageously simplify the training process, reduce the number of trainers, and allow for tailoring of the training to a particular machine and/or to a particular skill level for each field engineer, thereby resulting in a reduction in the time and cost associated with attending and operating a training facility. In addition, the methods and systems of the present invention also advantageously increase the capability of a field engineer to install, maintain, and repair more than one type of machine and machines manufactured by different manufacturers, reduce the number of field engineers required for managing installation, maintenance, and repair of machines, and reduce the time in responding to malfunctioning machines, thereby reducing the amount of downtime of the machines. Furthermore, such methods and systems allow field engineers to readily respond to the increasing frequency in the introduction of new machines or new models having changes in their configuration. Overall, the methods and systems allow for providing a high level of service to customers.

BRIEF DESCRIPTION OF THE DRAWINGS

FIG. 2 is an illustration of one example of an interactive screen for prompting and obtaining data for cataloging reference materials for use in the system of FIG. 1;

FIG. 3 is a flow diagram of one example of a method, implemented using the system of FIG. 1, for enabling training of field service personnel and field service of machines;

FIG. 6 is an illustration of one example of an interactive screen for presenting a list of cataloged items in the method of FIG. 4.

DETAILED DESCRIPTION OF THE INVENTION

Figure 1:
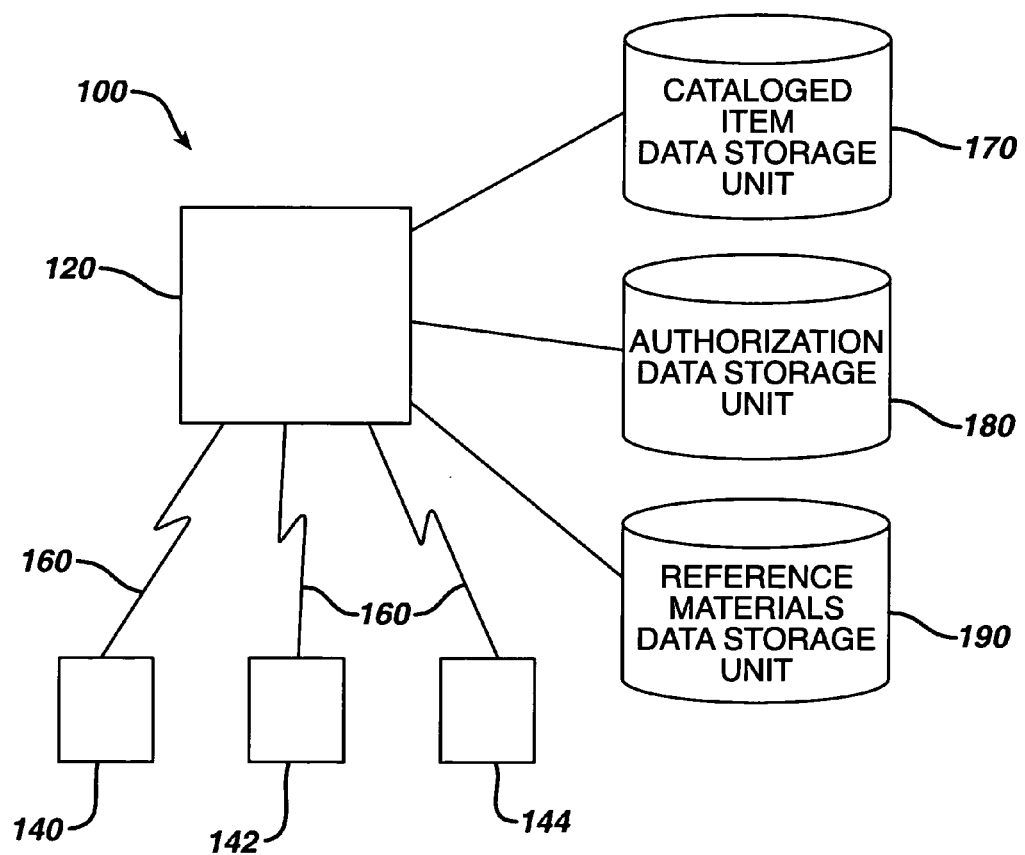
FIG. 1 is a block diagram illustrating one example of a system of the present invention for enabling training of field service personnel and field service of machines.

FIG. 1 is a block diagram of one example of a computing environment or system 100 incorporating and using the capabilities and techniques of the present invention for enabling training of field service personnel and field service of machines such as computed tomography (CT) machines, magnetic resonance imaging (MRI) machines, mammography machines, ultrasound machines, x-ray machines. System 100 allows leveraging existing information source materials or reference materials, such as, for example, portions of product installation manuals, service manuals, field modification information (FMI) or updates, training manuals, safety information, design diagrams, parts lists, and other reference materials useful either in training field service personnel or in field service of machines. Described in greater detail below are the creation of cataloged items corresponding to various reference materials, searching of the cataloged items, and retrieval of copies of the reference materials.

Although the present invention is described in connection with medical equipment, the systems and methods of the present invention can be used and applied in connection with other electronic and mechanical machines, such as, for example, automotive engines and office equipment.

System 100 is desirably maintained by or on behalf of a machine manufacturer or service provider and usable by field service personnel at a training facility or on-site during, for example, installation, maintenance, or repair of a machine. In addition, system 100 can be included as part of a service contract with a customer, such as, for example, a hospital or medical center for maintenance of medical machines based on a yearly or per visit fee arrangement.

Computing environment 100 includes, for instance, at least one first computing unit 120 coupled to at least one second computing unit 140. In one example, as shown in FIG. 1, a plurality of second computing units 140, 142, and 144 are desirably handheld computers, each of which is usable by a field engineer and may be transported to a different location, e.g., to different hands-on labs or workshops at a training facility or to different customer sites, while computing unit 120 is a centrally located server. First computing unit 120 is coupled to second computing units 140, 142, and 144 via a communications network 160.

Each computing unit typically includes, for example, one or more central processing units, memory and one or more input/output devices, as is well known in the art. First computing unit 120 is based, for instance, on a Sun workstation running a Unix operating system. First computing unit 120 desirably includes or has access to memory or data storage units, e.g., hard drive(s), compact disk(s), tape drive(s), etc., for storing various data, for example, in cataloged item data storage unit 170, authorization data storage unit 180, and reference material data storage unit 190, which are accessed and used in training field service personnel and in field service of machines as described in greater detail below.

Second computing units 140, 142, and 144 are, for instance, portable computers, such as handheld personal computers executing Microsoft WINDOWS CE, which runs on the Intel PC architecture.

Communications network 160 typically comprises a local area network or a global communications network such as the Internet which comprises a vast number of computers and computer networks that are interconnected through communication links. The interconnected computers exchange information using various services, such as electronic mail, and the World Wide Web ("WWW"). The WWW service allows computing unit 120 (i.e., Web server or Web site) to send graphical Web pages of information to remote second computing units 140, 142, and 144. The second computing units 140, 142, and 144 can then display the Web pages. Each resource (e.g., computer or Web page) of the WWW is uniquely identifiable by a Uniform Resource Locator ("URL"). To view a specific Web page, for example, second computing unit 140 specifies the URL for that Web page in a request (e.g., a HyperText Transfer Protocol ("HTTP") request). The request is forwarded to the Web server, for example, first computing unit 120, that supports that Web page. When that Web server receives the request, it sends that Web page to second computing unit 140. When second computing unit 140 receives that Web page, it typically displays the Web page using a browser. A browser is a special-purpose application program that effects the requesting of Web pages and the displaying of Web pages. Second computing unit 140 typically uses a browser such as Microsoft INTERNET EXPLORER or Netscape NAVIGATOR.

More particularly, web pages are typically defined using HyperText Markup Language ("HTML"). HTML provides a standard set of tags that define how a Web page is to be displayed. When a field engineer indicates to the browser to display a Web page, the browser sends a request to first computing unit 120 to transfer to second computing unit 140 a HTML document that defines the Web page. When the requested HTML document is received by second computing unit 140, the browser displays the Web page as defined by the HTML document. The HTML document contains various tags that control the displaying of text, graphics, controls, and other features. The HTML document may contain URLs of other Web pages available on first computing unit 120 or other server computer systems.

The above-described computing environment and/or computing units are only offered as examples. The present invention can be incorporated and used with many types of computing units, computers, processors, nodes, systems, workstations and/or environments without departing from the spirit of the present invention. Additionally, in various aspects of the present invention, the field engineer need not be remote from first computing unit 120. Various aspects of the invention are equally applicable to computing units running on the same physical machine, different physical machines or any combinations thereof. For example, the present invention may be implemented on a handheld computer or laptop computer wherein the cataloged items, authorization data and reference materials are stored on a compact disk.

Cataloged items data storage unit 170 is used for cataloging the reference materials. In particular, the cataloged items are readily searchable to identify those reference materials uniquely suited to the needs of the field engineer in training and in field service of a machine.

The process of cataloging, e.g., extracting specific information, rating, or describing the reference material, is desirably performed by experienced field engineers and training personnel and is based on various criteria. FIG. 2 illustrates an interactive screen 200, displayable using system 100 (FIG. 1), for creating, viewing, and revising a cataloged item corresponding to a reference material.

Information screen 200 includes three main sections. Section 220 relates to description information, section 240 relates to block or reference material information, and section 260 relates to the cataloged item history. Section 220 includes prompts and entry fields for "Modality" or the type of the machine, "product" such as model name and number, "Skill level," "Primary Service Task," "Secondary Service Task," "Additional Service Tasks," "Keywords," and "Authorization Level." The entry fields may contain a single entry or multiple entries, e.g., a field may include two or more model names and numbers. As discussed in greater detail below, this "Description Information" relates and corresponds to selectable menu items in a search request.

Section 240 includes "Title," "Document," "Revision," "Direction" or document reference number, "Section," "Page," "Location," "File Size," and "CD-ROM Revision." For example, the title may contain general terms such as safety, diagnostic, calibration, etc. which can be used in ranking the search of the cataloged items as explained below. Desirably, the "Location" includes an accessible hyperlink (e.g., http:// location) can be inputted into the entry field to link to the reference material, as discussed above. Section 260 includes "Created By," "Created On," "Last Modified By," and "Last Modified On."

Desirably, the cataloged data storage unit is readily updated to reflect any new or additional changes to the various reference materials. This may further include receiving feedback from field service personnel during training or when in the field. For example, an interactive screen may be provided to rank the value of the reference material which was provided by the system to the field engineer in training or in field service of a machine.

FIG. 3 illustrates a flow diagram of a general overview of one example of a computer implemented method 300 incorporating and using the capabilities and techniques of the present invention for enabling training of field service personnel and field service of machines. As explained in greater detail below, method 300 is designed to produce search results which are tailored to a training or service task. Desirably, method 300 is implemented using the Internet or a global computer network, (e.g., system 100 as illustrated in FIG. 1 and described above), to allow field service personnel to readily access the various reference materials while in the field or on-site when installing, maintaining, repairing, or updating machines.

As shown in FIG. 3, initially method 300 includes obtaining data associated with areas of interest or a search request such as obtaining data relating to the machine or product type and model number at 310, obtaining data relating to the skill level of the field service personnel at 320, and data relating to a service task or keyword at 330. At 340, a list of cataloged items is generated (e.g., extracted from cataloged storage unit 170, FIG. 1) associated with reference materials relating to training of field service personnel or field service of machines based on the search request, e.g., data relating to the machine, the skill level, and the service task or keyword. Thereafter, a copy of the reference material is retrieved at 350 (e.g., from reference data storage unit 190, FIG. 1) based on a selected one of the listed catalog items. For example, complete text or graphic image of the reference material can be stored in data storage unit 190 (FIG. 1) and retrieved and displayed, e.g., on a display of a handheld computer, to the field engineer. The method also includes repeating steps 310, 320, 330, to modify the search request and to generate a new list of cataloged items, and returning to the generated list of cataloged items to retrieve copies of the reference materials for the other listed cataloged items.

Figure 4:
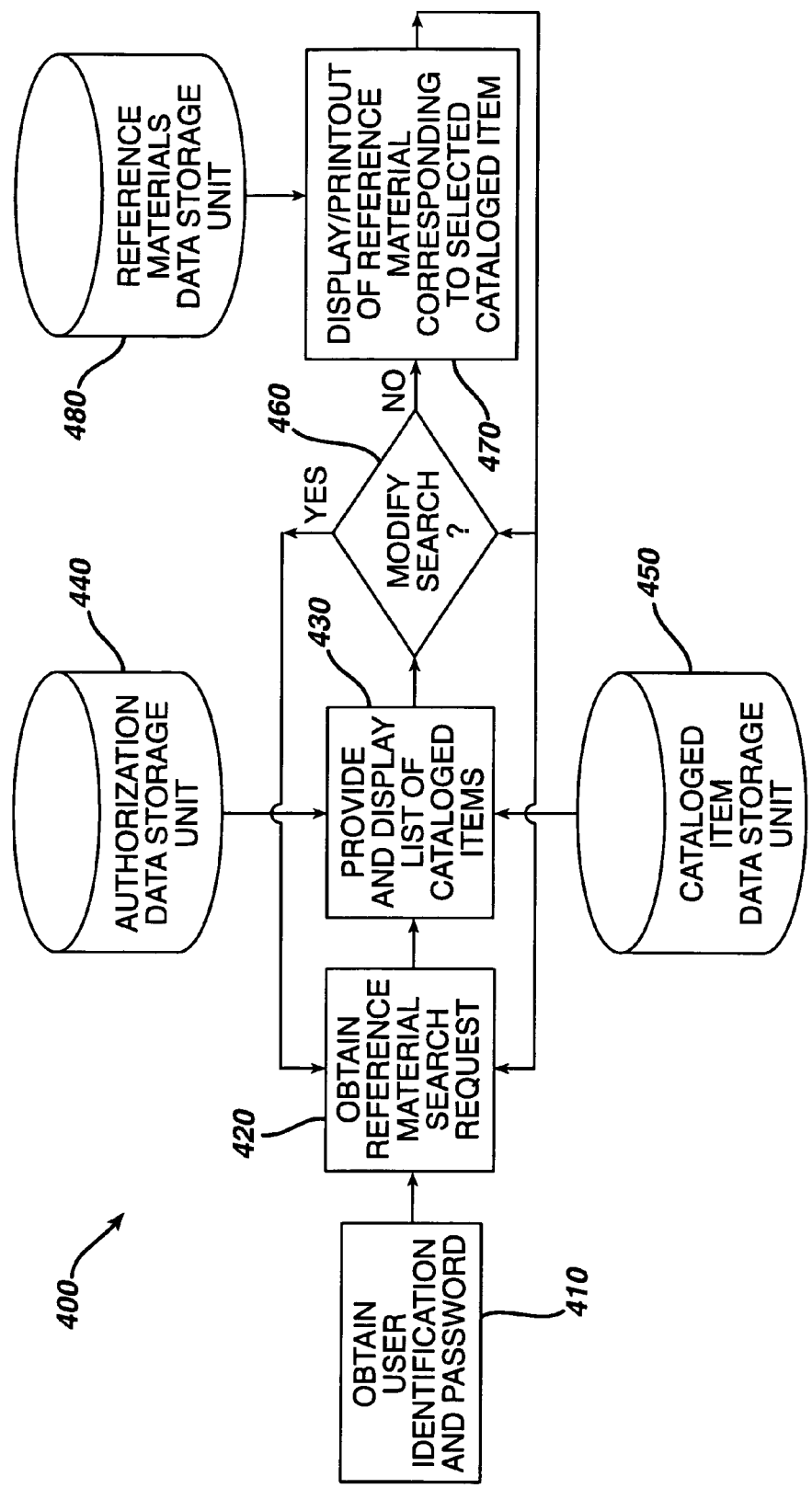
FIG. 4 is a flow diagram of another example of a method, implemented using the system of FIG. 1, for enabling training of field service personnel and field service of machines.

FIG. 4 illustrates a flow diagram of another computer implemented method 400 for enabling training of field service personnel and in field service of machines. In this embodiment, at 410, a field engineer at a training facility or at a customer's site initially inputs a user identification and password. For example, an initial interactive screen is displayed on a handheld computer. Such an interactive screen desirably includes prompts and entry fields for a user name and a password via a keyboard or mouse.

Figure 5:
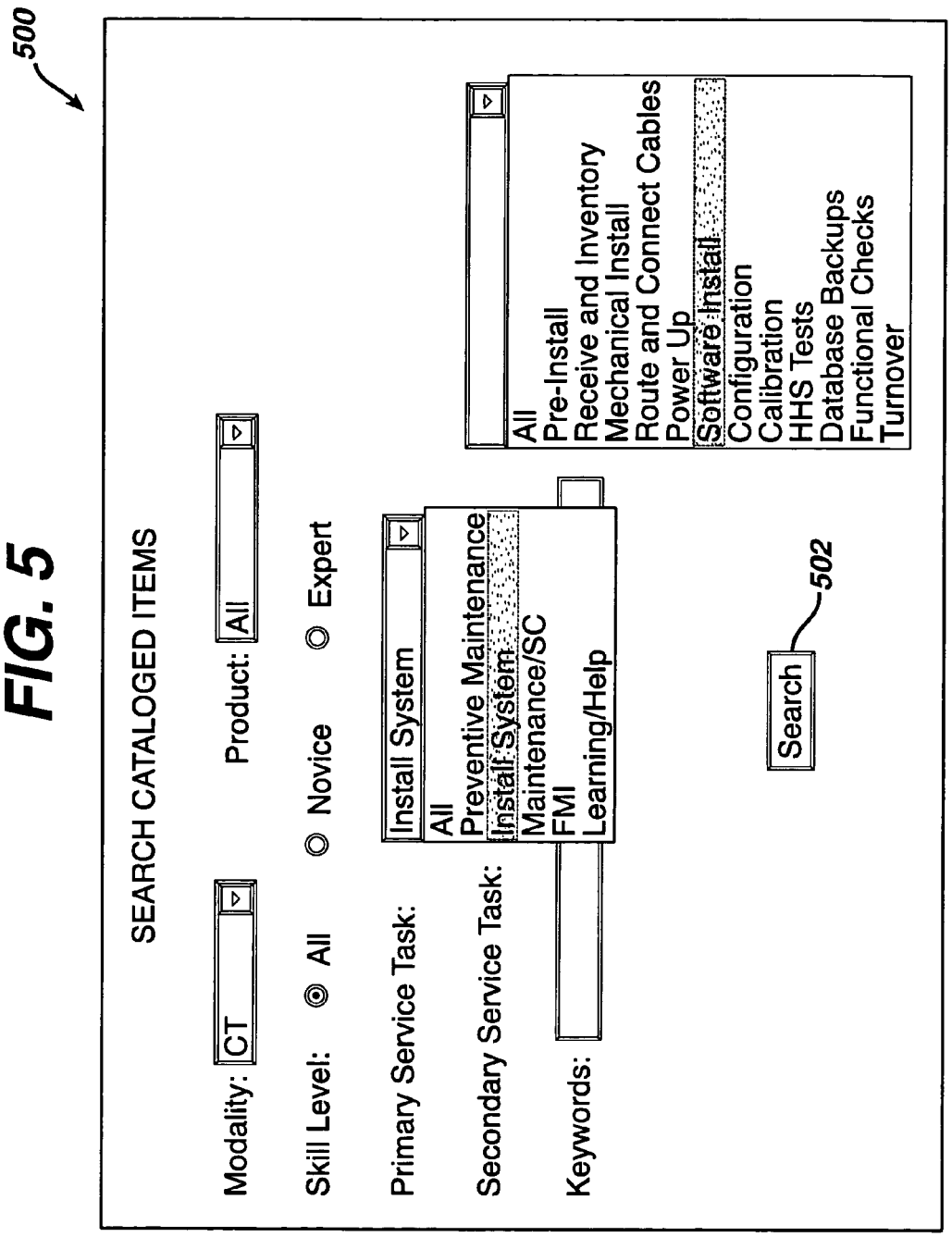
FIG. 5 is an illustration of one example of an interactive screen for prompting and obtaining a reference material search request in the method of FIG. 4.

At 420, desirably an interactive screen facilitates forming a search request via a keyboard or mouse. FIG. 5 illustrates one embodiment of an interactive screen 500, displayable using a web browser on a handheld computer for aiding a field engineer in readily inputting a search request by choosing from a menu of choices. For example, interactive screen 500 includes drop-down menus for selecting a "Modality" such as a type of machine, e.g., "CT," "MRI," "MAMMOGRAPHY," "ULTRASOUND," "X-RAY," and a "Product" or model name and number, e.g., "All," or a specific model name. Desirably, based on the selected type of machine, different drop-down menu items corresponding to the selected type of machine are displayed.

Interactive screen 500 for forming a search request also provides for selecting a desired skill level by the field engineer, e.g., "All," "Novice," or "Expert," and provides for selecting a "Primary Service Task" and a "Secondary Service Task" as well as inputting "Keywords." Desirably, the service tasks include user selectable drop-down menu items. For example, "Primary Service Task" include "ALL," "Preventive Maintenance," "Install System," "Maintenance/SC," "FMI" (field modification information), and "Leaning/Help." Secondary service task items for "Install System" includes, for example, "All," "Pre-Install," "Receive and Inventory," "Mechanical Install," "Route and Connect Cables," "Power Up," "Software Install," "Configuration," "Calibration," "HHS Tests," "Database Backups," "Functional Checks," and "Turnover."

Additional service tasks which are more particularly directed to training may include "Theory of Machine Operation," "Typical Machine Design," "Trouble Shooting," etc. From the present description, it will be appreciated by those skilled in the art that a field engineer can use the system to train for repairing a particular machine malfunction at the site, e.g., hospital, and then perform the necessary repair to a machine.

Once the search request is inputted into and/or selected on the interactive information screen, the filed engineer continues by clicking on a "Search" button 502, to transmit the search request from computing unit 140 (FIG. 1) to computing unit 120 (FIG. 1).

With reference again to FIG. 4, at 430, the user identification is used in retrieving a classification or authorization level associated with the field engineer from an authorization data storage unit 440. This allows limiting retrieval to select cataloged items, and thus, limiting retrieval of the reference materials. Authorization levels include, for example, general access, access with permission, (e.g., per fee), access by the machine manufacturer's employees, access by manufacturer's authorized field service personnel, etc. Desirably, the authorization levels are hierarchical, e.g., a machine manufacturer's field engineers also have general access.

In addition, at 430, a cataloged item data storage unit 450 (containing cataloged items created as discussed above with reference to FIG. 2) is searched and those cataloged items corresponding to the search request and the authorization level of the field engineer are selected to form a list of cataloged items which are then transferred from computing unit 120 (FIG. 1) to computing unit 140 (FIG. 1), and displayed on the handheld computer of the field engineer. FIG. 6 illustrates an example of a display of an interactive search result screen 600 or list of cataloged items which includes the title of the reference material. Desirably, the cataloged items can be listed by relevance, e.g., first by safety, then diagnostic, then calibration, etc. In addition, desirably, when "Expert" is selected, those cataloged items relevant to "Notice" are not listed or shown.

With reference again to FIG. 4, at 460, the field engineer can modify the search by returning to the search request (FIG. 5), save the search, or review the list of catalog items to quickly determine whether the results are responsive to the field engineer needs and select one or more of the corresponding reference materials by clicking on a listed catalog item to view the corresponding reference material. As discussed above, the listed cataloged items are desirably hyperlinked using their titles or a separate "view Item" to retrieve, at 470, the corresponding reference material from reference material data storage unit 480.

Advantageously the method and system enable a field engineer to readily retrieve relevant reference material in a specific area of interest and with a very low error rate, i.e., avoiding retrieval of non-relevant reference material. In addition, such a method and system direct the engineer to the specifically needed information, e.g., to the necessary chapter, paragraph, diagram, part list, etc.

From the present description, it will be appreciated by those skilled in the art that the methods and systems are universally applicable, regardless of language of the reference materials, size of library (i.e., number of reference materials), and the type of the reference materials. In addition, it will be appreciated that an infinite number of categories for classification of the reference materials are permissible. New reference materials and revisions or updates to the cataloged items can be easily incorporated.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer implemented method for enabling training of field service personnel for at least one machine selected from the group consisting of computed tomography (CT) machines, magnetic resonance imaging (MRI) machines, mammography machines, ultrasound machines, and x-ray machines, the computer implemented method comprising:
   obtaining a reference material search request;
   providing a list of at least one cataloged item associated with at least one reference material relating to training of field service personnel for said at least one machine based on the reference material search request; and
   providing a copy of the at least one reference material associated with the at least one cataloged item.

2. The computer implemented method of claim 1, wherein the reference material search request comprises data relating to at least one of data relating to said at least one machine, data relating to a skill level of the field service personnel, and data relating to a service task for said at least one machine.

3. The computer implemented method of claim 1, wherein the reference material search request comprises data relating to said at least one machine, data relating to a skill level of the field service personnel, and data relating to a service task for said at least one machine.

4. The computer implemented method of claim 3, wherein the data relating to said at least one machine comprises data relating to a product type and a model of said at least one machine, the data relating to the skill level of the field service personnel comprises data relating to at least one of novice and expert, and the data relating to the service task for said at least one machine comprises data relating to at least one of installation, maintenance, and modification of said at least one machine.

5. The computer implemented method of claim 1, wherein the providing the list comprises generating the list from a data storage unit comprising a plurality of cataloged items regarding a plurality of different machine types.

6. The computer implemented method of claim 1, wherein the providing the list comprises generating the list from a data storage unit comprising a plurality of cataloged items based on an authorization level.

7. The computer implemented method of claim 1, wherein the at least one cataloged item comprises at least one of data relating to said at least one machine, data relating to a skill level of the field service personnel, data relating to a service task for said at least one machine, and data relating to an authorization level.

8. The computer implemented method of claim 1, wherein the at least one cataloged item comprises data relating to said at least one machine, data relating to a skill level of the field service personnel, data relating to a service task for said at least one machine, and data relating to an authorization level.

9. The computer implemented method of claim 8, wherein the data relating to said at least one machine comprises data relating to a product type and a model of said at least one machine, the data relating to the skill level of the service personnel comprises data relating to at least one of novice and expert, and the data relating to the service task for said at least one machine comprises data relating to at least one of installation, maintenance, and modification of said at least one machine.

10. The computer implemented method of claim 1, wherein the providing the copy comprises retrieving the copy from a data storage unit comprising data relating to at least one of training manuals for said at least one machine and service manuals for said at least one machine.

11. A computer implemented method for enabling field service of at least one machine selected from the group consisting of computed tomography (CT) machines, magnetic resonance imaging (MRI) machines, mammography machines, ultrasound machines, and x-ray machines, the computer implemented method comprising:
   obtaining a reference material search request;
   providing a list of at least one cataloged item associated with at least one reference material relating to field service of said at least one machine based on the reference material search request; and
   providing a copy of the at least one reference material associated with the at least one cataloged item.

12. The computer implemented method of claim 11, wherein the reference material search request comprises data relating to at least one of data relating to said at least one machine, data relating to a skill level of the field service personnel, and data relating to a service task for said at least one machine.

13. The computer implemented method of claim 12, wherein the data relating to said at least one machine comprises data relating to a product type and a model of said at least one machine, the data relating to the skill level of the field service personnel comprises data relating to at least one of novice and expert, and the data relating to the service task for said at least one machine comprises data relating to at least one of installation, maintenance, and modification of said at least one machine.

14. The computer implemented method of claim 11, wherein the at least one cataloged item comprises at least one of data relating to said at least one machine, data relating to a skill level of the field service personnel, data relating to a service task for said at least one machine, and data relating to an authorization level.

15. The computer implemented method of claim 14, wherein the data relating to said at least one machine comprises data relating to a product type and a model of said at least one machine, the data relating to the skill level of the service personnel comprises data relating to at least one of novice and expert, and the data relating to the service task for said at least one machine comprises data relating to at least one of installation, maintenance, and modification of said at least one machine.

16. A method for enabling training of field service personnel for at least one machine selected from the group consisting of computed tomography (CT) machines, magnetic resonance imaging (MRI) machines, mammography machines, ultrasound machines, and x-ray machines, the method comprising:
    obtaining at a first computing unit a reference material search request from a second computing unit coupled to the first computing unit via a communications network;
    providing to the second computing unit a list of at least one cataloged item associated with at least one reference material relating to training of field service personnel for said at least one machine from the first computing unit based on the reference material search request; and
    providing to the second computing unit a copy of the at least one reference material associated with the at least one cataloged item from the first computing unit.

17. The method of claim 16, wherein the reference material search request comprises at least one of data relating to said at least one machine, data relating to a skill level of the field service personnel, and data relating to a service task for said at least one machine.

18. The method of claim 17, wherein the data relating to said at least one machine comprises data relating to a product type and a model of said at least one machine, the data relating to the skill level of the field service personnel comprises data relating to at least one of novice and expert, and the data relating to a service task comprises data relating to at least one of installation, maintenance, and modification of said at least one machine.

19. The method of claim 16, wherein the at least one cataloged item comprises at least one of data relating to said at least one machine, data relating to a skill level of the field service personnel, data relating to a service task for said at least one machine, and data relating to an authorization level.

20. The method of claim 19, wherein the data relating to said at least one machine comprises data relating to a product type and a model of said at least one machine, the data relating to the skill level of the field service personnel comprises data relating to at least one of novice and expert, and the data relating to the service task for said at least one machine comprises data relating to at least one of installation, maintenance, and modification of said at least one machine.

21. The method of claim 16, wherein the providing the copy comprises retrieving the copy from a data storage unit comprising data relating to at least one of training manuals and service manuals for said at least one machine.

22. The method of claim 16, wherein the second computing unit is a handheld computer.

23. The method of claim 16, wherein the communications network is a global computer network.

24. A method for enabling field service of at least one machine selected from the group consisting of computed tomography (CT) machines, magnetic resonance imaging (MRI) machines, mammography machines, ultrasound machines, and x-ray machines, the method comprising:
    obtaining at a first computing unit a reference material search request from a second computing unit coupled to the first computing unit via a communications network;
    providing to the second computing unit a list of at least one cataloged item associated with at least one reference material relating to field service of said at least one machine from the first computing unit based on the reference material search request; and
    providing to the second computing unit a copy of the at least one reference material associated with the at least one cataloged item from the first computing unit.

25. The method of claim 24, wherein the reference material search request comprises at least one of data relating to said at least one machine, data relating to a skill level of the field service personnel, and data relating to a service task for said at least one machine.

26. The method of claim 25, wherein the reference material search request comprises data relating to said at least one machine, data relating to a skill level of the field service personnel, and data relating to a service task for said at least one machine.

27. The method of claim 26, wherein the data relating to said at least one machine comprises data relating to a product type and a model of said at least one machine, the data relating to the skill level of the field service personnel comprises data relating to at least one of novice and expert, and the data relating to a service task comprises data relating to at least one of installation, maintenance, and modification of said at least one machine.

28. The method of claim 24, wherein the providing the list comprises generating the list from a data storage unit comprising a plurality of cataloged items regarding a plurality of different machine types.

29. The method of claim 24, wherein the providing the list comprises generating the list from a data storage unit comprising a plurality of cataloged items based on an authorization level.

30. The method of claim 24, wherein the at least one cataloged item comprises at least one of data relating to said at least one machine, data relating to a skill level of the field service personnel, data relating to a service task for said at least one machine, and data relating to an authorization level.

31. The method of claim 30, wherein the data relating to said at least one machine comprises data relating to a product type and a model of said at least one machine, the data relating to the skill level of the field service personnel comprises data relating to at least one of novice and expert, and the data relating to the service task for said at least one machine comprises data relating to at least one of installation, maintenance, and modification of said at least one machine.

32. The method of claim 24, wherein the providing the copy comprises retrieving the copy from a data storage unit comprising data relating to at least one of training manuals and service manuals for said at least one machine.

33. The method of claim 24, wherein the second computing unit is a handheld computer.

34. The method of claim 24, wherein the communications network is a global computer network.

35. A system for enabling training of field service personnel for at least one machine selected from the group consisting of computed tomography (CT) machines, magnetic resonance imaging (MIRI) machines, mammography machines, ultrasound machines, and x-ray machines, said system comprising at least one processor adapted to obtain a reference material search request,
  wherein said at least one processor is adapted to provide a list of at least one cataloged item associated with at least one reference material relating to training of field service personnel for said at least one machine based on the reference material search request, and
  wherein said at least one processor is further adapted to provide a copy of the at least one reference material associated with the at least one cataloged item.

36. The system of claim 35, wherein the search request comprises data relating to said at least one machine, data relating to a skill level of the field service personnel, and data relating to a service task for said at least one machine.

37. The system of claim 36, wherein the data relating to the machine comprises data relating to product type and model, the data relating to a skill level comprises data relating to at least one of novice and expert, and the data relating to a service task comprises data relating to at least one of installation, maintenance, and modification.

38. The system of claim 35, wherein the at least one processor is adapted to generate the list from a data storage unit comprising a plurality of cataloged items regarding a plurality of different machine types.

39. The system of claim 35, wherein the at least one processor is adapted to generate the list from a data storage unit comprising a plurality of cataloged items based on an authorization level.

40. The system of claim 35, wherein the at least one cataloged item comprises at least one of data relating to said at least one machine, data relating to a skill level of the field service personnel, data relating to a service task for said at least one machine, and data relating to an authorization level.

41. The system of claim 35, wherein the at least one processor is adapted to retrieve the copy from a data storage unit comprising data relating to at least one of training manuals for said at least one machine and service manuals for said at least one machine.

42. A system for enabling field service of at least one machine selected from the group consisting of computed tomography (CT) machines, magnetic resonance imaging (MRI) machines, mammography machines, ultrasound machines, and x-ray machines, said system comprising at least one processor adapted to obtain a reference material search request,
  wherein said at least one processor is adapted to provide a list of at least one cataloged item associated with at least one reference material relating to field service of said at least one machine based on the reference material search request, and
  wherein said at least one processor is further adapted to provide a copy of the at least one reference material associated with the at least one cataloged item.

* * * * *